(12) United States Patent
Wong

(10) Patent No.: US 8,857,790 B2
(45) Date of Patent: Oct. 14, 2014

(54) LOCKING MECHANISM FOR UNISEX BALL VALVE COUPLING

(71) Applicant: Raycon Industries, Inc., Brea, CA (US)

(72) Inventor: Tak-Yiu Wong, Long Beach, CA (US)

(73) Assignee: Raycon Industries, Inc., Brea, CA (US)

( * ) Notice: Subject to any disclaimer, the term of this patent is extended or adjusted under 35 U.S.C. 154(b) by 0 days.

(21) Appl. No.: 13/675,967

(22) Filed: Nov. 13, 2012

(65) Prior Publication Data

US 2013/0193361 A1     Aug. 1, 2013

Related U.S. Application Data

(60) Provisional application No. 61/559,473, filed on Nov. 14, 2011.

(51) Int. Cl.

| | |
|---|---|
| *F16L 37/38* | (2006.01) |
| *F16L 37/44* | (2006.01) |
| *F16K 35/10* | (2006.01) |
| *F16K 5/06* | (2006.01) |
| *F16K 27/06* | (2006.01) |

(52) U.S. Cl.
CPC ............. *F16K 27/067* (2013.01); *F16K 5/0647* (2013.01); *F16K 35/10* (2013.01)
USPC ........................................ 251/149.9; 251/111

(58) Field of Classification Search
CPC ......... F16K 35/14; F16L 37/373; F16L 37/47
USPC ............ 251/89, 89.5, 111, 149.5, 149.9, 148; 137/614.06
See application file for complete search history.

(56) References Cited

U.S. PATENT DOCUMENTS

| | | | | |
|---|---|---|---|---|
| 5,332,001 | A | * | 7/1994 | Brown ...................... 137/614.06 |
| 5,505,428 | A | | 4/1996 | Moss et al. |
| 5,595,217 | A | * | 1/1997 | Gillen et al. ............. 137/614.06 |
| 5,671,777 | A | * | 9/1997 | Allen et al. .............. 137/614.06 |
| 2013/0032234 | A1 | * | 2/2013 | Densel et al. ................. 137/798 |

\* cited by examiner

*Primary Examiner* — John K Fristoe, Jr.
*Assistant Examiner* — Jonathan Waddy
(74) *Attorney, Agent, or Firm* — Knobbe, Martens, Olson & Bear, LLP

(57) ABSTRACT

A unisex ball valve coupling includes an interface end that engages an interface end of a mating coupling half assembly. A valve of the coupling has a valve body, which has an open position in which fluid flow is permitted through the internal passage and a closed position in which the valve body closes off fluid flow through the internal passage. A valve shaft rotates with the valve body between the open position and the closed position. The valve shaft has a first surface. A blocking member is movable from a blocking position to a non-blocking position within the body portion. In the blocking position, the blocking member engages the first surface of the valve shaft to secure the valve body in the closed position and, in the non-blocking position, the blocking member does not engage the first surface of the valve shaft to permit opening of the valve.

11 Claims, 3 Drawing Sheets

LOCKING MECHANISM FOR UNISEX BALL VALVE COUPLING

RELATED APPLICATIONS

Related applications are listed in an Application Data Sheet (ADS) accompanying this application. The entirety of each related application listed on the ADS is expressly incorporated by reference herein.

BACKGROUND

1. Field of the Invention

The present invention relates to a unisex coupling or a quick disconnect coupling, in which two identical coupling halves can be connected to one another normally by relative rotation therebetween. In particular, the present invention relates to a unisex coupling with a locking mechanism.

2. Description of the Related Art

The ball valved type unisex coupling currently in production utilizes a manually operated ball valve being opened or closed by turning a handle. When two identical halves are connected, an interface seal will be engaged against each other. As the ball valves are open, a flow path will be established through the coupling assembly. Also, while the assemblies are connected and valve opened, a locking mechanism will be actuated by the operating handles so that the two connected coupling halves cannot be disconnected as long as either one of the ball valves remains open.

In the one such unisex coupling currently produced by the Assignee of the present application and disclosed in U.S. Patent Publication No. US 2012/0007007 A1, the entirety of which is incorporated by reference herein, the valve shaft of the coupling has a cam section machined on its outwardly-facing surface. When the valve handle is turned, the cam mechanically drives a number of balls through the coupling body such that a portion of the ball in the far end (away from the cam surface) is driven into the path of the mating half latching lug, securing the mating half in the connected position. As the valve is turned to the closed position, the cam frees the balls to roll back into the valve body either by gravity or compression from the disconnecting turn motion of the mating half, thus freeing the mating half to be disconnected.

The unisex coupling is equipped with an operating handle to open or close the ball valve. The ball valve actuation is accomplished by turning of the handle. This handle features a spring locking mechanism with a plunger. When turned to the selected open or closed position, the spring will push the plunger into a respective slot on the handle boss of the coupling body such that the handle will be locked in the selected position and cannot be inadvertently turned from its selected position.

Unisex couplings of known existing art employ a locking mechanism to address the spillage safety of the coupling in the connected position, and such locking mechanisms prevent inadvertent disconnection of the coupling halves. While known locking mechanisms prevent the two halves from being disconnected unless the ball valves in both connected halves are in the closed position, it is still possible that the ball valve of a disconnected coupling could be mistakenly opened by operating the valve handle. Thus, while known locking mechanisms can provide a secured safety feature to prevent the coupling from being disconnected with a ball valve still in open position, it can only provide limited security to prevent a ball valve from being opened inadvertently when the coupling halves are disconnected. Known locking mechanisms do not prevent a user from unintentionally opening a ball valve, such as by taking the simple steps required to pull and turn the handle, while the coupling is in the disconnected condition. Opening a ball valve while the two halves are disconnected can result in spillage of the coupling's contents and in loss of pressure in the coupling.

SUMMARY

An object of at least some embodiments of the present invention is to provide a mechanism or means for securing the ball valve in the closed position with the coupling halves disconnected. As described above, a unisex coupling is a quick disconnect mechanism with two identical halves connected together by a turning action, which form a leak-tight flow path when connected that allows for the transfer of fluid through the coupling assembly. As understood by those skilled in the art, the coupling is referred to as "unisex" or "identical" because the interface portions of the two coupling halves are substantially identical (as opposed to having a male/female relationship or other non-identical arrangement). However, it is not necessary that the entirety of both coupling halves be identical. For example, one of the coupling halves may include a valve mechanism, while the other of the coupling halves may not.

Preferred embodiments of the present invention employ a cross shaft to secure the ball valve in the closed position when the coupling is in the disconnected position. In some embodiments, the coupling ball valve rotates (e.g., from open to closed) above at least one valve shaft, which may be a handle shaft and a guide shaft, aligned through the axis of the ball valve. One or more of the valve shafts can comprise a notch or other recess on its outer diameter. A lock shaft or cross shaft comprising stepped diameters, or other features that create an interference or blocking portion, can be positioned against the notched valve shaft. Some embodiments of the cross shaft can be spring loaded so that one end of the shaft protrudes beyond the interface end of the coupling while the coupling is in the disconnected position. When the coupling is in the disconnected position, an interference or blocking portion of the cross shaft (e.g., the larger of the stepped diameters of the cross shaft) can engage the valve shaft at the notch, and can prevent the valve shaft from being rotated.

In some embodiments, when the two halves of the coupling are connected, they are secured to each other at the interface by the latching lugs. The closing of the interface compresses the cross shaft, comprising at least two stepped diameters, into the coupling body against a loading spring. As the cross shaft is compressed, its large diameter portion clears the notch on the valve shaft and allows the valve shaft to be rotated into the small diameter portion of the cross shaft, allowing the ball valve to be opened only with the halves of the coupling in the connected position.

Some embodiments of the present invention are intended to retain features of the unisex couplings of the existing art, for example, the feature that the coupling ball valve must be fully closed before the coupling halves can be disconnected. In certain embodiments, closing the ball valve can align the notch on the valve shaft with the cross shaft. Some embodiments can employ disconnecting and separating of the coupling halves to allow the spring to move the large diameter section of the cross shaft back into the notch section of the valve shaft, securing the ball valve in the closed position.

At least some of the preferred embodiments differ from the existing art in at least one respect by employing a mechanism that prevents the ball valve of a disconnected coupling from being opened by turning the valve handle. Benefits of such an arrangement include, but are not limited to: the coupling needs to be connected and therefore fully sealed before the coupling ball valve handle can be turned open, providing the necessary spillage security when the unisex coupling is in the disconnected position. In comparison to the prior art, preferred embodiments of the present invention are more secure from inadvertent spillage of the coupling contents and from inadvertent changes in the pressure of the coupling.

An embodiment involves a unisex ball valve coupling including a body portion having an internal passage and an interface end that is configured to engage an interface end of a mating coupling half assembly. The interface end includes a circumferential groove configured to receive a portion of the interface end of the mating coupling half. A valve is positioned within the body portion. The valve has a valve body, which has an open position in which fluid flow is permitted through the internal passage and a closed position in which the valve body closes off fluid flow through the internal passage. The valve also includes a valve shaft that engages the valve body and rotates with the valve body between the open position and the closed position. The valve shaft has a first surface. A blocking member is movable from a blocking position to a non-blocking position within the body portion. In the blocking position, the blocking member engages the first surface of the valve shaft to secure the valve body in the closed position and, in the non-blocking position, the blocking member does not engage the first surface of the valve shaft to permit opening of the valve.

In some configurations, the blocking member is biased toward the blocking position by a biasing member. The biasing member can be a coil spring. The interface end can define a groove that receives a portion of an interface end of the mating coupling half, wherein a portion of the blocking member is located within the groove in the non-blocking position. The interface end of the mating coupling half can contact the portion of the blocking member and move the blocking member to the non-blocking position when the mating coupling half is coupled to the interface end of the unisex ball valve coupling.

In some configurations, a locking mechanism prevents the unisex ball valve coupling from being disconnected from a mating coupling half when the valve is in the open position.

An embodiment involves a unisex ball valve coupling including a body portion having an internal passage and an interface end that is configured to engage an interface end of a mating coupling half assembly. The interface end includes a circumferential groove configured to receive a portion of the interface end of the mating coupling half. A valve within the body portion has a valve body, which has an open position in which fluid flow is permitted through the internal passage and a closed position in which the valve body closes off fluid flow through the internal passage. The valve also includes a valve shaft that engages the valve body and rotates with the valve body between the open position and the closed position. The valve shaft has a notched portion. A handle is coupled to the valve shaft and the valve shaft rotates along with rotation of the handle such that the handle can be used to move the valve body between the open position and the closed position. A cross shaft within the body portion includes a first portion having a first diameter and a second portion having a reduced diameter relative to the first diameter. The cross shaft has a first position in which the first portion of the cross shaft engages the valve shaft at the notched portion and secures the valve body in the closed position. The cross shaft also has a second position in which the second portion is aligned with the valve shaft and permits the valve body to move from the closed position.

In some configurations, the cross shaft is biased toward the first position by a biasing member. The biasing member can be a coil spring. The interface end can define a groove that receives a portion of an interface end of the mating coupling half, wherein an end portion of the cross shaft is located within the groove in the non-blocking position. The interface end of the mating coupling half can contact the end portion of the cross shaft and move the cross shaft to the second position when the mating coupling half is coupled to the interface end of the unisex ball valve coupling.

In some configurations, the second portion of the cross shaft comprises a tapered cross-section having a variable diameter.

In some configurations, a locking mechanism can prevent the unisex ball valve coupling from being disconnected from a mating coupling half when the valve is in the open position.

DETAILED DESCRIPTION

Figures 1, 2:
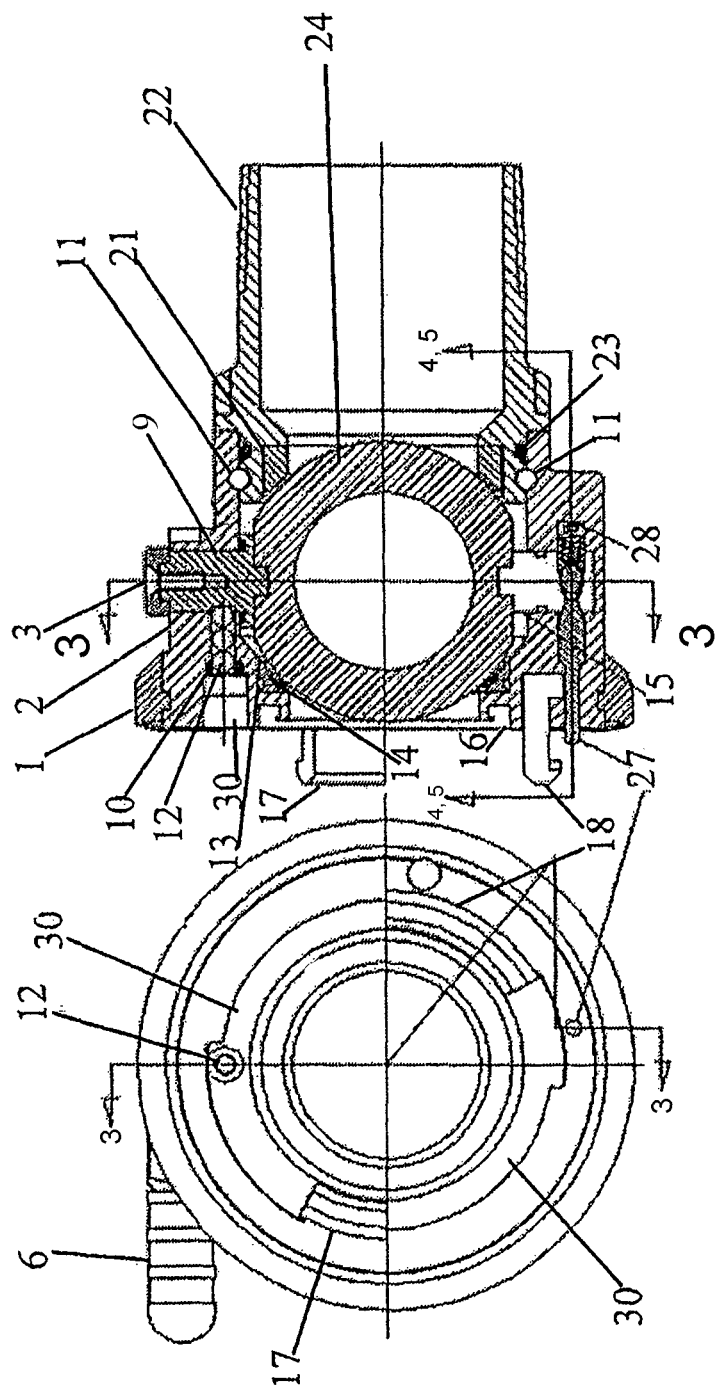
FIG. 1 shows an end view of an embodiment of an assembled coupling half that includes a ball valve, with a ball valve in the closed position. The other coupling half of the assembly is not shown for clarity.
FIG. 2 shows a cutaway view of an embodiment of an assembled coupling half that includes a ball valve, with the ball valve in the closed position. The other coupling half of the assembly is not shown for clarity.
Figure 3:
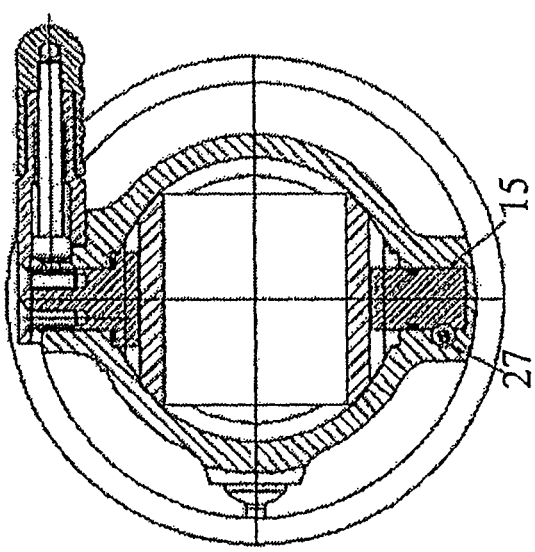
FIG. 3 shows a cutaway view of an embodiment of an assembled coupling half, with a cross shaft against a guide shaft.

FIGS. 1-3 show an embodiment of a unisex coupling assembly having a preferably generally or substantially cylindrical body 2 with a bumper 1 installed at its interface end for drag and drop protection. A butterfly-shaped groove 30 with an undercut can be machined or otherwise formed at the interface end of the body. Two latching lugs 17 and 18 can be positioned relative to the groove such that the latching lugs 17 and 18 can be inserted into the butterfly shape groove of the mating half and can latch to it upon being turned for connection. There are multiple ways that the latching lugs 17 and 18 may be secured to the coupling body 2. In some embodiments, they can be secured with use of fasteners. In other embodiments they can be machined as part of the coupling body 2. Other suitable methods for forming or attaching the lugs 17 and 18 may also be used. In some embodiments, an interface seal 16 can be installed at the interface end of the coupling body 2. When the coupling halves are connected, the interface seals 16 of both halves can engage each other to form a leak-tight interface between the two halves.

Some embodiments of the valved version of the unisex coupling can be equipped with a valve arrangement, such as a ball valve 24, inside the coupling body 2. The ball valve 24 can turn about an axis defined by the rotational centers of the handle shaft 9 and guide shaft 15 (also referred to collectively as the valve shaft). When turned to the closed position, the ball valve can engage a seal ring 14 to stop external leakage through the interface end of the coupling. In some embodiments, the seal ring 14 can be equipped with an O-ring seal 13 which can seal between the seal ring 14 outside diameter and coupling body 2 inside diameter to inhibit or eliminate external leakage around the seal ring 14.

In some embodiments, the ball valve 24 can be opened or closed by turning the handle 6. The illustrated handle 6 can be secured to the handle shaft 9, for example by using fasteners such as screws 3. Certain embodiments of the handle 6 can be equipped with a locking mechanism. The locking mechanism can lock the handle 6 and hence the ball valve 24 in either the open or closed position when so selected by an interference or interlocking mechanism or arrangement between the handle assembly and the coupling body 2, such as that described in U.S. Patent Publication No. US 2012/0007007 A1.

Some embodiments of the cam action ball jamming mechanism can include a number of balls 12 trapped in a hole in the coupling body 2 between the handle shaft 9 (or other portion of the valve shaft) and the bottom surface of the butterfly shaped groove, which accommodates the mating coupling latching lugs. The balls 12 can be retained in the coupling body 2 by a retaining disc 10 which can be compression fitted (or otherwise secured) into the coupling body 2. In some embodiments, the balls 12 can engage a cam section (not specifically identified) machined or otherwise provided on the side surface of the handle shaft 9. When the handle shaft 9 and the ball valve 24 are in the closed position, the cam of the handle shaft 9 allows the balls 12 to retract into the coupling body 2 opening up a free path in the butterfly shaped groove to accommodate the latching lugs from the mating coupling. In some embodiments, after the two coupling halves are connected, placing the handle 6 in the open position can allow the cam of the handle shaft 9 to jam the end one of these balls 12 into the bottom of the butterfly shaft groove at the interface of the coupling body 2. When the end one of the balls 12 is located in the disconnection path for one of the latching lugs 17, 18 of the mating coupling, placing the ball valve 24 of either mating coupling half in open position blocks the other half from being turned for disconnection. Although a series of balls 12 are illustrated, and are used for their ability to smoothly move within the hole of the coupling body 2, other suitable bodies may be provided to transfer the motion of the cam surface to a blocking member within the butterfly shaft groove. For example, a non-spherical member (such as a rod) could be used alone or between two end balls 12 to transfer motion from a ball 12 contacting the cam surface to the end ball 12 that moves into the butterfly shaft groove and acts as a blocking member. Preferred arrangements do not require spring-biasing and avoid intricately-shaped motion transfer mechanisms, such as gears.

As in the unisex coupling of existing art, some embodiments of the end of the coupling body 2 opposite to the interface end comprises an adapter end 22. The adapter end 22 of the unisex coupling can comprise a ball swivel 11 such that an adapter 22 of all fitting methods (threads, flanges, hose barbs, camlock fittings etc.) can be installed for assembly of the unisex coupling to its mounting equipment (such as hoses, nozzles etc.) as required. Certain embodiments of the adapter 22 can comprise an O-ring seal 23 which can establish a leakage free swivel with the coupling body 2. In some embodiments, a thrust bushing 21 can be placed between the ball valve 2 and the adapter 22 to align the valve ball 24 with the handle shaft 9 and guide shaft 15, facilitating turning of the ball valve 24 to the opened or closed position.

Also disclosed herein is a mechanism for securing the ball valve 24 in the closed position when the coupling halves are disconnected from one another or either coupling half is not connected to a mating coupling half. Preferably, the mechanism includes a blocking member (e.g., a cross shaft 27) that has a first or blocking position when the coupling half is disconnected and a second or non-blocking position when the coupling half is connected. In the blocking position, the blocking member preferably interferes with rotation of the ball valve 24 from a closed position to an open position to inhibit or prevent opening of the ball valve 24. The interference may be with any portion of the valve arrangement of the coupling, and in one preferred embodiment is with the valve shaft (e.g., the guide shaft 15 or the handle shaft 9). In some embodiments, the guide shaft 15 is blocked by the blocking member; however, in other embodiments the handle shaft 15 could be blocked by the blocking member. In the non-blocking position, the blocking member does not interfere with rotation of the valve thereby permitting the valve to be moved to the open position. Preferably, the blocking member is biased toward the blocking position and can be moved to the non-blocking position by the cooperating coupling half. Some embodiments of this mechanism comprise a biased (e.g., biased by a spring 28) cross shaft 27 comprising a recess or an inwardly-stepped diameter in the coupling body 2. In some embodiments, the guide shaft 15 can be provided with a recess or notched section 32. As shown in FIG. 3, some embodiments of the cross shaft 27 can be positioned perpendicularly next to the guide shaft 15. With the two halves of the unisex coupling disconnected with the ball valve 24 closed, the spring 28 can push the cross shaft 27 such that the end of the cross shaft 27 protrudes beyond the interface end of the coupling body 2 and also positions the large diameter portion of the cross shaft 27 into the notched section 32 of the guide shaft 15. This arrangement can cause the cross shaft 15 to block rotation of the guide shaft 15 and thereby prevent the ball valve 24 from being rotated open.

Figure 4:
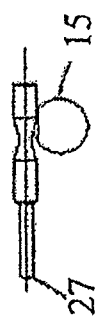
FIG. 4 shows an embodiment of a cross shaft against a guide shaft in a relative position that occurs in a disconnected coupling with a ball valve in the closed position. For clarity, the cross shaft and guide shaft are shown separated from the remaining components of the coupling half
Figure 5:
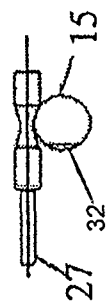
FIG. 5 shows the cross shaft and guide shaft of FIG. 4 in a relative position that occurs in a connected coupling with a ball valve in the open position.

As shown in FIGS. 4-5, in some embodiments ball valve closure can cause the notched section 32 of the guide shaft 15 to align with the cross shaft 27. Upon disconnection of the coupling halves, the cross shaft 15 is to be reset by the loading spring 28 (numbered in FIG. 2) such that the large diameter of the cross section 15 moves back into the notch 32 on the guide shaft 15, securing the ball valve closed when the halves of the coupling are in the disconnected position. In some embodiments, engagement of the coupling interface ends can compress the cross shaft 27 into the coupling body, disengaging the large diameter portion of the cross shaft 27 from the notch 32 of the guide shaft 15. Disengaging the cross shaft 27 from the notch 32 allows the guide shaft 15 to be turned into the small diameter portion of the cross shaft 27, allowing the ball valve to be rotated open.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present interface locking mechanism for a unisex ball valve coupling has been described in the context of particularly preferred embodiments, the skilled artisan will appreciate, in view of the present disclosure, that certain advantages, features and aspects of the mechanism and overall system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention.

Thus, it is intended that the scope of the present invention herein disclosed should not be limited by the particular disclosed embodiments described above, but should be determined only by a fair reading of the claims.

What is claimed is:

1. A unisex ball valve coupling comprising:
   a body portion having an internal passage and an interface end that is configured to engage an interface end of a mating coupling half assembly, the interface end comprising a circumferential groove configured to receive a portion of the interface end of the mating coupling half;
   a valve within the body portion, the valve having a valve body, which has an open position in which fluid flow is permitted through the internal passage and a closed position in which the valve body closes off fluid flow through the internal passage, the valve further comprising a valve shaft that engages the valve body and rotates with the valve body between the open position and the closed position, the valve shaft having a first surface;
   a blocking member movable from a blocking position to a non-blocking position within the body portion, wherein the blocking member is biased towards the blocking position by a biasing member;
   wherein in the blocking position the blocking member engages the first surface of the valve shaft to secure the valve body in the closed position and in the non-blocking position the blocking member does not engage the first surface of the valve shaft to permit opening of the valve.

2. The unisex ball valve coupling of claim 1, wherein the biasing member is a coil spring.

3. The unisex ball valve coupling of claim 2, wherein a portion of the the blocking member is located within the circumferential groove in the blocking position.

4. The unisex ball valve coupling of claim 3, wherein the interface end of the mating coupling half contacts the portion of the blocking member and moves the blocking member to the non-blocking position when the mating coupling half is coupled to the interface end of the unisex ball valve coupling.

5. The unisex ball valve coupling of claim 1, further comprising a locking mechanism that prevents the unisex ball valve coupling from being disconnected from the mating coupling half when the valve is in the open position.

6. A unisex ball valve coupling comprising:
   a body portion having an internal passage and an interface end that is configured to engage an interface end of a mating coupling half assembly, the interface end comprising a circumferential groove configured to receive a portion of the interface end of the mating coupling half;
   a valve within the body portion, the valve having a valve body, which has an open position in which fluid flow is permitted through the internal passage and a closed position in which the valve body closes off fluid flow through the internal passage, the valve further comprising a valve shaft that engages the valve body and rotates with the valve body between the open position and the closed position, the valve shaft having a notched portion;
   a handle coupled to the valve shaft, wherein the valve shaft rotates along with rotation of the handle such that the handle can be used to move the valve body between the open position and the closed position;
   a cross shaft within the body portion, the cross shaft comprising a first portion having a first diameter and a second portion having a reduced diameter relative to the first diameter;
   wherein the cross shaft has a first position in which the first portion of the cross shaft engages the valve shaft at the notched portion and secures the valve body in the closed position, and wherein the cross shaft has a second position in which the second portion is aligned with the valve shaft and permits the valve body to move from the closed position wherein the cross shaft is biased towards the first position by a biasing member.

7. The unisex ball valve coupling of claim 6, wherein the biasing member is coil spring.

8. The unisex ball valve coupling of claim 7, wherein an end portion of the cross shaft is located within the circumferential groove in the first position.

9. The unisex ball valve coupling of claim 8, wherein the interface end of the mating coupling half contacts the end portion of the cross shaft and moves the cross shaft to the second position when the mating coupling half is coupled to the interface end of the unisex ball valve coupling.

10. The unisex ball valve coupling of claim 6, wherein the second portion of the cross shaft comprises a tapered cross-section having a variable diameter.

11. The unisex ball valve coupling of claim 6, further comprising a locking mechanism that prevents the unisex ball valve coupling from being disconnected from the mating coupling half when the valve is in the open position.

* * * * *